(12) United States Patent
Cheng (10) Patent No.: US 10,343,342 B2
(45) Date of Patent: Jul. 9, 2019

(54) CONNECTING PIECE IMPLANTING DEVICE AND CONNECTING PIECE IMPLANTING METHOD

(71) Applicant: Shenzhen Huasheng NC Technology Co., Ltd, Shenzhen, Guangdong (CN)

(72) Inventor: Huaguang Cheng, Guangdong (CN)

(73) Assignee: Shenzhen Huasheng NC Technology Co., Ltd, Shenzhen (CN)

( * ) Notice: Subject to any disclaimer, the term of this patent is extended or adjusted under 35 U.S.C. 154(b) by 264 days.

(21) Appl. No.: 15/093,782

(22) Filed: Apr. 8, 2016

(65) Prior Publication Data

US 2016/0221251 A1    Aug. 4, 2016

Related U.S. Application Data

(63) Continuation of application No. PCT/CN2014/086874, filed on Sep. 18, 2014.

(51) Int. Cl.
| | |
|---|---|
| *B29C 65/00* | (2006.01) |
| *B29C 65/44* | (2006.01) |
| *B29C 65/78* | (2006.01) |
| *B29C 65/18* | (2006.01) |
| *B29K 101/12* | (2006.01) |
| *B29K 705/00* | (2006.01) |
| *B29L 1/00* | (2006.01) |

(52) U.S. Cl.
CPC .............. *B29C 65/44* (2013.01); *B29C 65/18* (2013.01); *B29C 65/7858* (2013.01); *B29C 66/47* (2013.01); *B29C 66/532* (2013.01); *B29C 66/7392* (2013.01); *B29C 66/742* (2013.01); *B29C 66/8182* (2013.01); *B29C 66/8183* (2013.01); *B29C 66/8322* (2013.01); *B29C 66/8748* (2013.01); *B29K 2101/12* (2013.01); *B29K 2705/00* (2013.01); *B29L 2001/005* (2013.01)

(58) Field of Classification Search
CPC . B29C 65/44; B29C 65/7858; B29C 66/8322; B29C 65/18
See application file for complete search history.

(56) References Cited

FOREIGN PATENT DOCUMENTS

CN        103358548 A   * 10/2013

OTHER PUBLICATIONS

Machine translation of CN-103358548-A (Year: 2013).*

* cited by examiner

*Primary Examiner* — Christopher T Schatz (57) ABSTRACT

The present invention provides a connecting piece implanting device and a connecting piece implanting method. The connecting piece implanting device includes a base, a feeding unit, a pressing unit, a sliding platform and a fixed pressing block. The sliding platform is arranged on the base, and the fixed pressing block is arranged above the sliding platform. The pushing device has the following beneficial effects: firstly, the push plate is divided into two parts for clamping the connecting piece most importantly, so as to completely eliminate rollover, upwarp and other malposition problems of the connecting piece, secondly, the push plate can be freely changed according to the thickness of the connecting piece, thus the application range is wider, and thirdly, a convex plate and a concave plate are arranged to effectively prevent empty pressing and wrong pressing.

8 Claims, 9 Drawing Sheets

CONNECTING PIECE IMPLANTING DEVICE AND CONNECTING PIECE IMPLANTING METHOD

CROSS-REFERENCE TO RELATED APPLICATIONS

The present application is a Continuation Application of PCT application No. PCT/CN2014/086874 filed on Sep. 18, 2014, the contents of which are hereby incorporated by reference.

FIELD OF THE INVENTION

The present invention relates to the field of hot melting equipment, and particularly to the field of metal piece implanting equipment.

BACKGROUND OF THE INVENTION

The existing implanting device is mainly used for fixedly arranging a metal connecting piece in a plastic piece, so as to connect the plastic piece with other components through the metal connecting piece, generally, a metal nut or screw is pressed by a pressing needle to a corresponding position of the plastic piece in a heating manner, the corresponding position of the plastic piece is hot melted by the raised high temperature of the metal connecting piece to embed the metal connecting piece therein, and a nut implanting device is taken as an example for analysis and illustration in the prior art.

Figure 1:
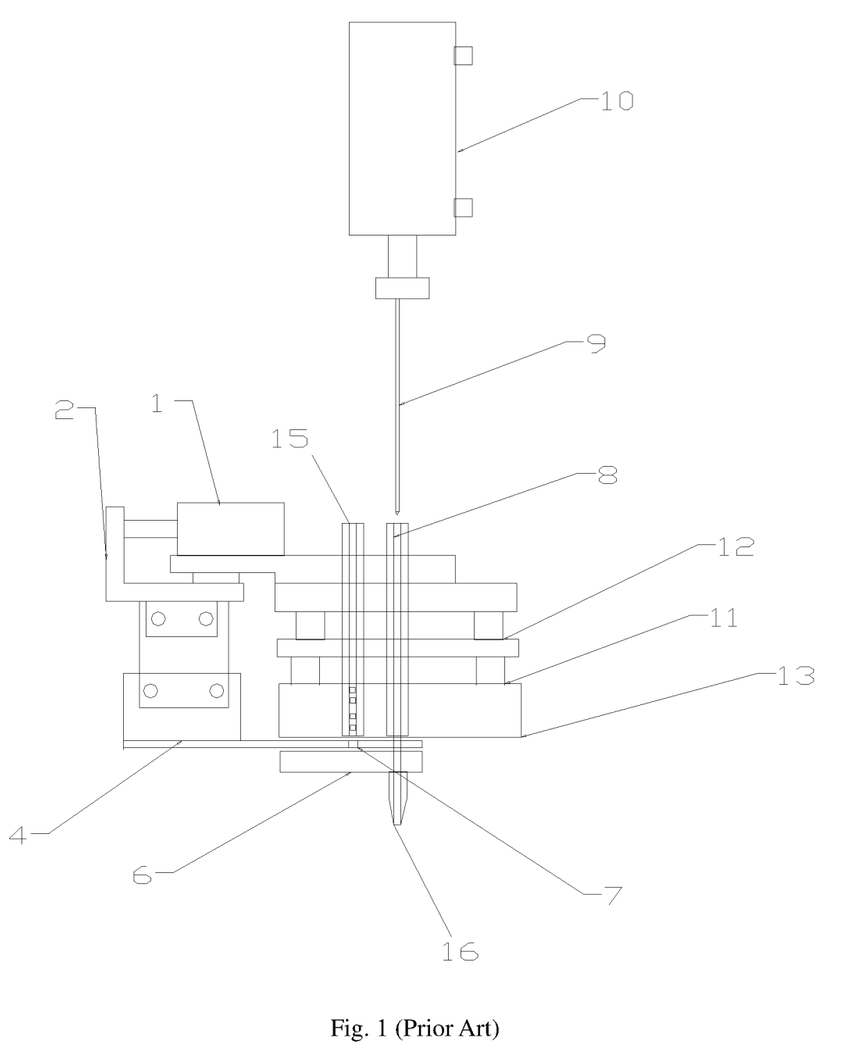
FIG. 1 is a schematic diagram of an implanting device provided by the prior art.

As shown in FIG. 1, a handpiece of an existing full-automatic numerical control nut implanting machine includes a pushing cylinder and a pressing cylinder for completing pushing and pressing operation respectively. A vibrating disk arranged at the top of the full-automatic numerical control nut implanting machine sequentially conveys nuts to a preheating component one by one in a vibration manner, the preheating component includes a heating copper plate 13 used for heating the nuts, a flexible heating pipeline 15 used as a nut preheating passage, a heating hole 7 which is arranged at a bottom end of the flexible heating pipeline 15 and is embedded into the heating copper plate 13 for placing the heated nuts, and a thermal baffle 12 and a thermal insulation column 11 which are arranged above the heating copper plate 13 for isolating thermal conduction, the nuts directly drop into the heating hole 7 at the bottom end of the flexible heating pipeline 15 from the interior of the flexible heating pipeline 15 by self gravity to be preheated by a heat source provided by the heating copper plate 13, and the subsequent steps are pushing and pressing operations.

The operation process of the pushing step is as follows: after the temperature reaches a preheating required value of 260° C., a pushing cylinder 1 pushes a driving bracket 2 which is integrally connected with a piston rod of the pushing cylinder and drives a conveying slide block 4 which is fixedly connected with the driving bracket 2 by a fixing screw, the conveying slide block 4 pushes the preheated nut in the heating hole 7 forward into a nut access hole at the bottom end of a pressing passage 8 through the heating hole 7 arranged at the bottom end of the flexible heating pipeline 15 and a conveying support plate 6 below the nut access hole at the bottom end of the pressing passage 8, and then pushing operation is finished.

The operation process of the pressing step is as follows: a pressing cylinder 10 pushes a pressing needle 9 which is integrally connected with the piston rod of the pressing cylinder downward into the pressing passage 8 arranged right below the pressing needle, the nut, which is previously pushed by the conveying slide block 4 into the nut access hole at the bottom end of the pressing passage 8, is pressed into a feeding nozzle 16 which is arranged below the conveying support plate 6 and is aligned to the nut access hole at the bottom end of the pressing passage 8, and then pressing operation is finished.

The pushing cylinder 1 and the pressing cylinder 10 repeatedly and independently operate back and forth, in order to preheat the nuts, which are promiscuously thrown into the vibrating disk and drop into the heating hole 7 at the bottom end of the flexible heating pipeline 15, by the heat source provided by the heating copper plate 13 together, automatically transform the nuts into sequentially arranged nuts to be implanted and sequentially convey the nuts into the feeding nozzle 16 one by one, and the nuts are prepared to be implanted to set positions of a related plastic shell on a precisely-located mechanical arm.

The equipment in the prior art has the following technical problems:

1. the heating hole 7 of the conveying sliding plate 4 bears the nuts dropping at the free gravity, presses the nuts to the pressing passage 8 and presses the nuts downward, the nuts bear no force in the heating hole 7, and thus the nuts may generate rollover or upwarp on one side, resulting in a reduced implantation yield.

2. In the prior art, the conveying sliding plate 4 is fixedly connected with the thermal baffle, the positional relationship is firm, in the case of nuts or connecting pieces with different sizes, the handpiece can be only changed, so that the application range is not wide, assembly and disassembly are cumbersome, and in the case of blockage, machine halt and other faults, local maintenance can be only carried out after the entirety is demounted, and the maintenance also experiences certain difficulty.

3. In the prior art, when the connecting pieces are used up or the connecting pieces are clamped, the conveying sliding plate cannot sense the situation in general and will continuously act, and the pressing needle will continue to press the nut downward to form an empty pressing phenomenon, resulting in a reduced yield.

4. Since the pushing cylinder and the pressing cylinder independently operate, in the case of an operation error, the pressing needle is liable to impact the conveying sliding plate by mistake to cause a mechanical fault.

5. In the prior art, the thermal baffle is arranged between the heating plate and the cylinder and the like, such that the design is complex, the maintenance is cumbersome, and the entire device is not trim or clean enough.

SUMMARY OF THE INVENTION

The present invention provides a connecting piece implanting device and a connecting piece implanting method, for solving the problem in the prior art that a connecting piece is vulnerable to rollover or upwarp after being in place, and the phenomena of cumbersome maintenance, empty pressing and wrong pressing.

To solve the above problems, the present invention provides a connecting piece implanting device, including a base, a feeding unit, a pressing unit, a sliding platform and a fixed pressing block, wherein the sliding platform is arranged on the base, the fixed pressing block is arranged above the sliding platform, wherein, the feeding unit includes a pushing device and a push plate connected with the pushing device in a horizontal direction, and a station capable of holding a connecting piece is arranged on the push plate;

the pressing unit includes a pressing device, a pressing needle connected with the pressing device in a vertical direction and a pressing passage penetrating through the sliding platform and the base, and the pressing needle is driven by the pressing device to move up and down in the pressing passage;

the push plate is arranged between the sliding platform and the fixed pressing block, an up and down through chute is arranged on the push plate, the fixed pressing block and the sliding platform are both provided with corresponding pin holes, and a locating pin penetrates through the pin holes of the fixed pressing block and the sliding platform and the chute on the push plate to fix the three components;

a feeding hole and a pressing hole are further arranged on the fixed pressing block, the feeding hole and the pressing hole are arranged to be vertical to the push plate in parallel, the pressing hole is aligned to the pressing passage, the pressing needle presses the connecting piece into the pressing passage until arriving at a working surface after passing through the pressing hole, the feeding hole is located on the same straight line with the pressing passage and the chute, the distance between the feeding hole and the pressing passage is equal to the length of the chute, the station corresponds to the feeding hole before the push plate moves and corresponds to the pressing passage after the push plate moves in place, the fixed pressing block is provided with a through hole capable of penetrating through a heating pipe, and the heating pipe is arranged in the through hole; and the push plate is divided into a convex plate and a concave plate, one end of the convex plate is connected with a power output end of the pushing device, the other end of the convex plate is used as a free end for pushing the connecting piece, an outer edge of the convex plate is a straight edge, the middle part of an inner edge of the convex plate is provided with a projection extending inwards in the horizontal direction, the outer edge of the concave plate is a straight edge as well, the concave plate is divided into two parts, the chute is arranged on the first part, the width of the second part is decreased, an arc-shaped clamping part is arranged at a plane step formed at the part with the decreased width of the concave plate, the arc-shaped clamping part corresponds to the free end for pushing the connecting piece of the convex plate, the free end of the convex plate and the arc-shaped clamping part form the station, the width of the first part of the concave plate is a sum of the width of the second part of the concave plate and the width of the convex plate, the inner edge of the second part of the concave plate is provided with a groove capable of holding the projection, the depth of the groove is larger than or equal to the length of the projection, the inner edges of the convex plate and the concave plate are mutually jointed, and a pressing block groove capable of holding the push plate is arranged on a lower surface of the fixed pressing block.

By means of the above technical solution, the pushing device provided by the present invention has the following beneficial effects: firstly, the push plate is divided into two parts for clamping the connecting piece most importantly, so as to completely eliminate rollover, upwarp and other malposition problems of the connecting piece, secondly, the push plate can be freely changed according to the thickness of the connecting piece, thus the application range is wider, and thirdly, the convex plate and the concave plate are arranged to effectively prevent empty pressing and wrong pressing under a condition of lacking material.

Preferably, a locking pin with a downward elastic force is arranged at a position aligned to the projection of the convex plate on the fixed pressing block, the width of the groove is larger than that of the projection, and a width difference between the two components is larger than or equal to the diameter of the locking pin.

Preferably, a micro switch is arranged above the locking pin, the micro switch is connected with a central processing unit, the pushing device and the pressing device are connected with the central processing unit and are controlled by the central processing unit, and the heating pipe is connected with the central processing unit.

Preferably, a trigger switch is arranged at a corresponding position on the end part of the end provided with the chute of the concave plate, the concave plate triggers the trigger switch after moving in place, and the trigger switch is connected with the central processing unit.

Preferably, the convex plate is connected with a push rod of the pushing device, and a thermal insulation gap is arranged between the concave plate and the push rod of the pushing device.

Preferably, a cooling fan is arranged on a side face of the pushing device, and the fan is connected with the base through a bracket.

Preferably, a discharging passage is arranged at a position aligned to the feeding hole on the sliding platform, and the discharging passage is blocked by a solid bolt.

Preferably, the substrate is made of a heat insulation material, and a connecting column is arranged at one end of the base for connecting a connecting platform and the base into an entirety.

The present invention further provides a connecting piece implanting method, including the connecting piece implanting device in the above technical solution, the connecting piece implanting device is installed on a machine movement axis, the lower end of the pressing passage is aligned to the working surface, a connecting piece needing to be implanted is input to the feeding hole, and a power supply is connected; the central processing unit instructs to preheat the fixed pressing block by the heating pipe, and the fixed pressing block preheats the connecting piece by thermal conduction; the connecting piece drops into the feeding hole and drops onto the station;

the central processing unit starts the pushing device to push the convex plate of the push plate to move, the free end of the convex plate props against the connecting piece, clamps the connecting piece with the arc-shaped clamping part and pushes the connecting piece to move, the concave plate slides along the locating pin via a thrust brought by the connecting piece, and when the inner end of the chute touches the locating pin, the connecting piece has arrived at the opening of the pressing passage;

at the same time, the trigger switch corresponding to the concave plate is triggered by the end part of the concave plate, and a signal is transmitted to the central processing unit;

the central processing unit sends an instruction to the pressing device, and the pressing device drives the pressing needle to press the connecting piece into the pressing passage through the pressing hole until arriving at the working surface directly;

thereafter, the central processing unit sends an instruction to the pressing device to pull back the pressing needle into the pressing hole above the pressing passage, then the central processing unit sends an instruction to the pressing device to withdraw the push plate, when the station arrives at the lower side of the feeding hole, the connecting piece falls into the work station under the self gravity, thus, an operating procedure is completed; and further, the operating procedure is repeated, the connecting piece implanting device is installed on the working surface of a corresponding position on the machine movement axis to implant the connecting piece, when no subsequent connecting piece is supplied after the connecting piece in the feeding hole is implanted, the central processing unit instructs the pushing device to continue to work, no connecting piece drops onto the station, at this time, the free end of the convex plate arrives at the neighborhood of the arc-shaped clamping part forward, while at this time, the projection of the convex plate moves forward in the groove of the concave plate to prop the side edge of the groove to transfer the gap between the projection and the groove to the rear side, due to the displacement of the projection, the locking pin pops up downward to be clamped into the gap formed by the projection and the groove, the push plate is locked and cannot move, the micro switch connected with the locking pin transmits the signal to the central processing unit, the central processing unit instructs to halt, and then a step of halting under a special condition of lacking material is completed.

DETAILED DESCRIPTION OF THE EMBODIMENTS

In order that the purposes, technical solutions and advantages of the present invention are clearer, a further detailed description of the present invention will be given below in combination with accompanying drawings. It should be understood that, specific embodiments described herein are merely used for explaining the present invention, rather than limiting the present invention.

Figure 2:
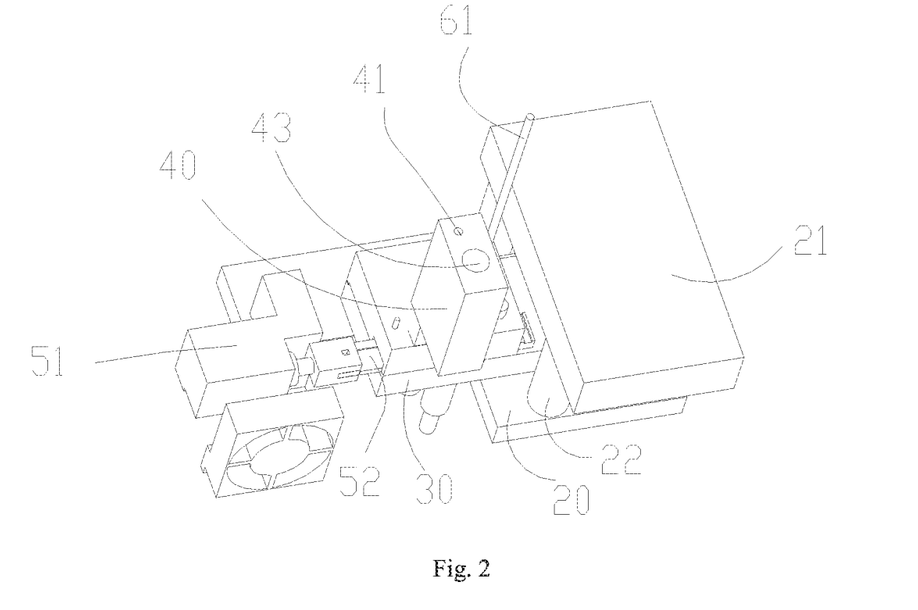
FIG. 2 is a complete stereoscopic schematic diagram of a product provided by the present invention.
Figure 3:
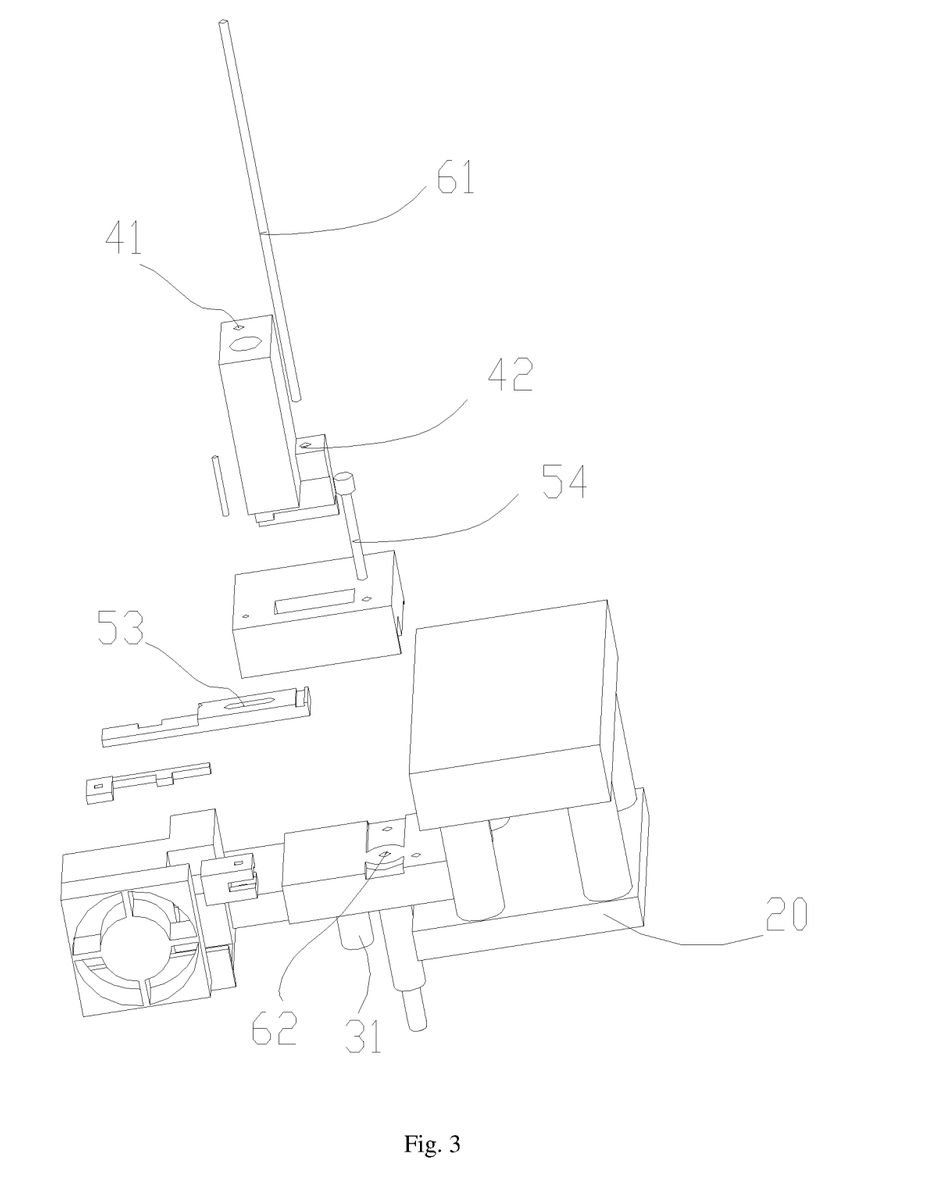
FIG. 3 is an exploded stereoscopic schematic diagram of the product provided by the present invention.
Figure 4:
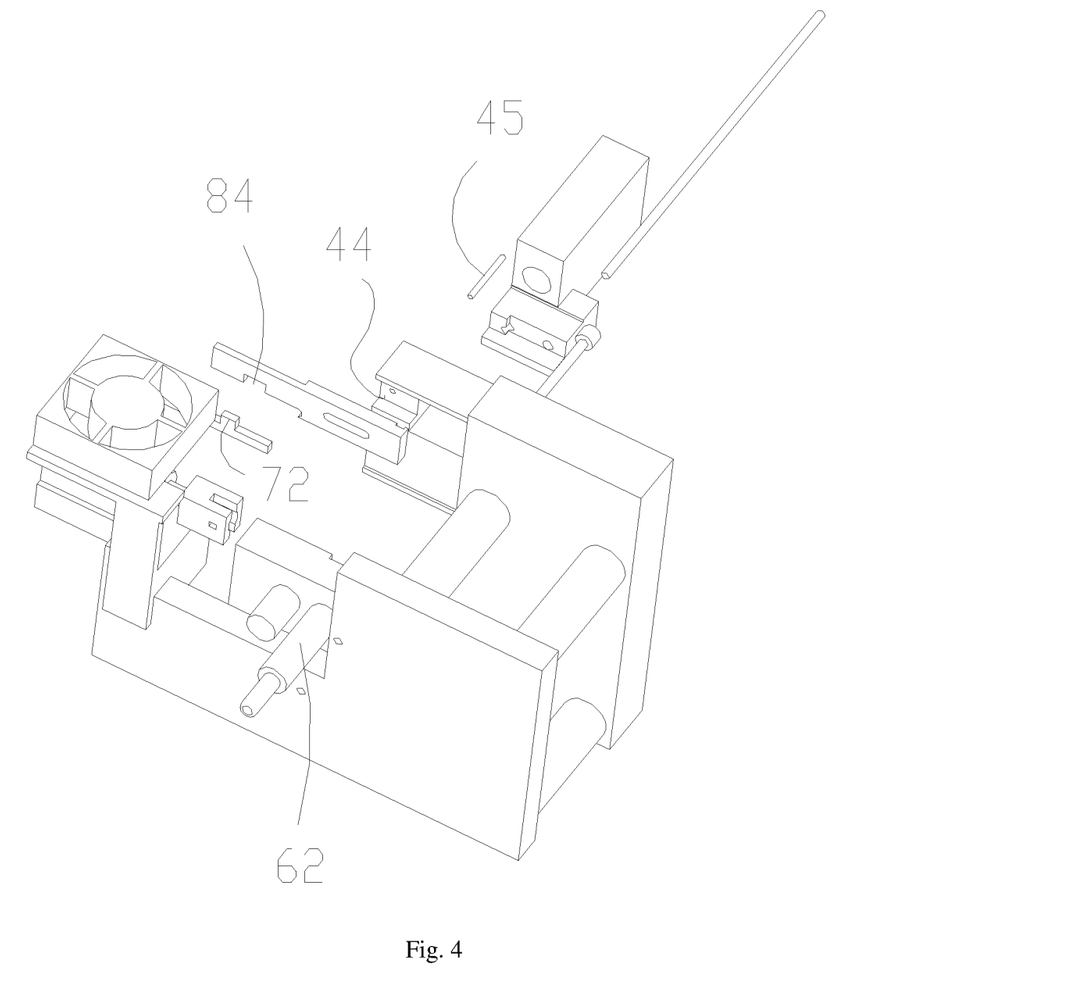
FIG. 4 is an exploded stereoscopic schematic diagram of a lower angle of the product provided by the present invention.
Figure 5:
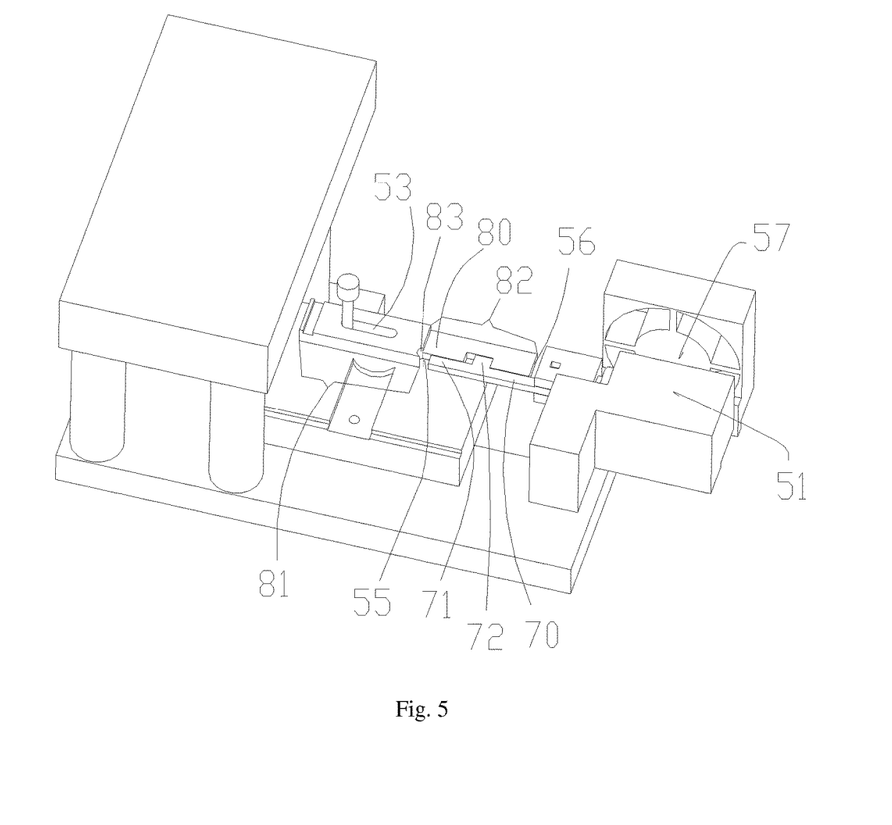
FIG. 5 is a working schematic diagram in a push plate of the product provided by the present invention.
Figure 6:
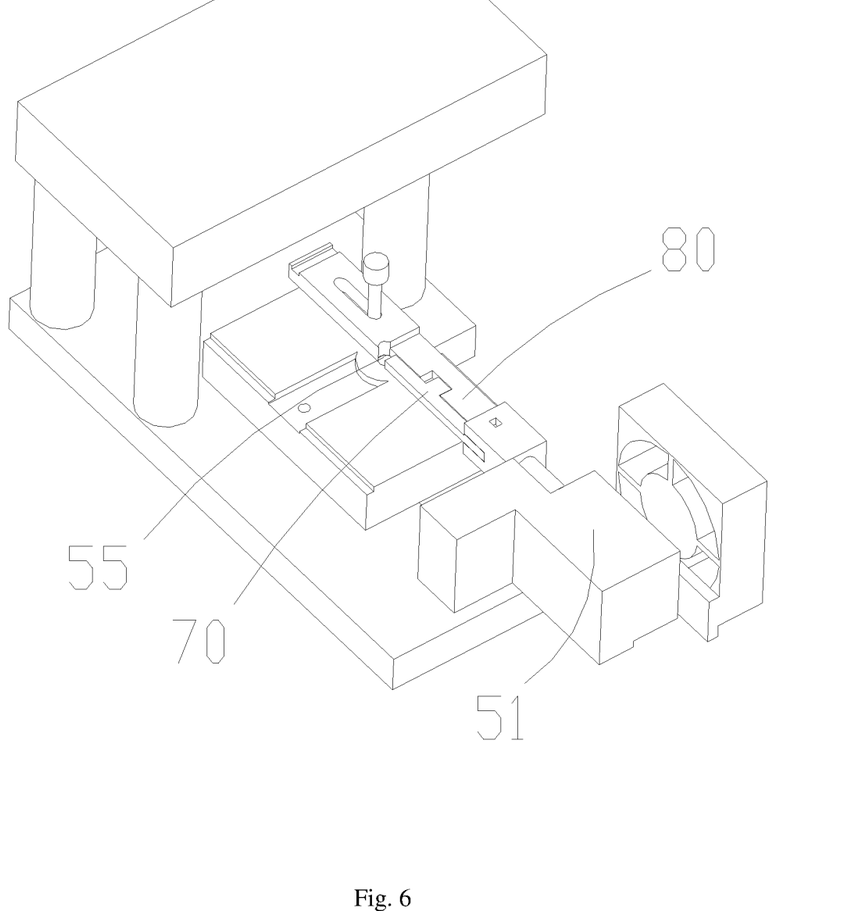
FIG. 6 is a working schematic diagram in the push plate from another angle of the product provided by the present invention.

Referring to FIG. 2, a connecting piece implanting device provided by the present invention includes a base 20, a feeding unit, a pressing unit, a sliding platform 30 and a fixed pressing block 40. The sliding platform 30 is arranged on the base 20, the fixed pressing block 40 is arranged above the sliding platform 30, wherein, the feeding unit includes a pushing device 51 and a push plate 52 connected with the pushing device 51 in a horizontal direction, and a station 55 capable of holding a connecting piece is arranged on the push plate 52;

the pressing unit includes a pressing device (not shown), a pressing needle 61 connected with the pressing device in a vertical direction and a pressing passage 62 penetrating through the sliding platform 30 and the base 20, and the pressing needle 61 is driven by the pressing device to move up and down in the pressing passage 62; the push plate 51 is arranged between the sliding platform 30 and the fixed pressing block 40, an up and down through chute 53 is arranged on the push plate 52, the fixed pressing block 40 and the sliding platform 30 are both provided with corresponding pin holes, and a locating pin 54 penetrates through the pin holes of the fixed pressing block 40 and the sliding platform 30 and the chute 53 on the push plate 51 to fix the three components into an entirety;

a feeding hole 41 and a pressing hole 42 are further arranged on the fixed pressing block 40, the feeding hole 41 and the pressing hole 42 are arranged to be vertical to the push plate 52 in parallel, the pressing hole 42 is aligned to the pressing passage 62, the pressing needle 61 presses the connecting piece into the pressing passage 62 until arriving at a working surface after passing through the pressing hole 42, the feeding hole 41 is located on the same straight line with the pressing passage 62 and the chute 53, the distance between the feeding hole 41 and the pressing passage 62 is equal to the length of the chute 53, the chute 53 not only limits the movement track of the push plate 52, but also limits the movement distance thereof, that is, the station 55 of the push plate 52 can only push the connecting piece to the opening above the pressing passage 62 after receiving the connecting piece below the feeding hole 41, the movement direction and the movement distance of the push plate 52 are regulated, however, the distance in the prior art is preset by a stepping motor, which is vulnerable to errors, the station 55 corresponds to the feeding hole 41 before the push plate 52 moves and corresponds to the pressing passage 62 after the push plate 52 moves in place, the fixed pressing block 40 is provided with a through hole 43 capable of penetrating through a heating pipe, the heating pipe (not shown) is arranged in the through hole 43, the heating pipe raises the temperature of the fixed pressing block 40 on the whole, since the connecting piece is generally made of a metal material, the thermal conductivity is good, and the volume of the connecting piece is relatively small, the heat can be transmitted to the connecting piece to quickly heat up the same by means of the thermal conduction of the fixed pressing block 40, and then a plastic piece on a hot melting working surface can be embedded therein;

the push plate 52 is divided into a convex plate 70 and a concave plate 80, one end of the convex plate 70 is connected with a power output end of the pushing device 51, the other end of the convex plate is used as a free end 71 for pushing the connecting piece, an outer edge of the convex plate 70 is a straight edge, the middle part of an inner edge of the convex plate is provided with a projection 72 extending inwards on the horizontal direction, the outer edge of the concave plate 80 is a straight edge as well, the concave plate 80 is divided into two parts, the chute 53 is arranged on the first part 81, the width of the second part 82 is decreased, an arc-shaped clamping part 83 is arranged at a plane step formed at the part with the decreased width of the concave plate 80, the arc-shaped clamping part 83 corresponds to the free end 71 for pushing the connecting piece of the convex plate 70, the free end 71 of the convex plate 70 and the arc-shaped clamping part 83 form the station 55, when the connecting piece drops onto the station 55, the convex plate 70 moves under the action of the pushing device 51 and cooperates with the arc-shaped clamping part 83 to form a resultant force to clamp the connecting piece, so as to push the connecting piece to the opening of the pressing passage 62 while keeping a regulated posture, the width of the first part 81 of the concave plate 80 is a sum of the width of the second part 82 of the concave plate 80 and the width of the convex plate 70, the inner edge of the second part 82 of the concave plate 80 is provided with a groove 84 capable of holding the projection 72, the depth of the groove 84 is larger than or equal to the length of the projection 72, the inner edges of the convex plate 70 and the concave plate 80 are mutually jointed, in a pushing process, the concave plate 80 is indirectly pushed by the convex plate 70 actually, the convex plate 70 transmits a thrust to the connecting piece, and the connecting piece further transmits the force to the arc-shaped clamping part 83 of the concave plate 80, therefore, the concave plate 80 is not directly subjected with the thrust of the convex plate 70 actually, in this way, the connecting piece is clamped under compulsion, a pressing block groove 44 capable of holding the push plate 52 is arranged on a lower surface of the fixed pressing block 40, the pressing block groove 44 limits the convex plate 70 and the concave plate 80, and the movement direction is regulated to prevent the two components from scattering.

Firstly, the push plate 52 is divided into two parts for clamping the connecting piece most importantly, so as to completely eliminate rollover, upwarp and other malposition problems of the connecting piece, secondly, the push plate 52 can be freely changed according to the thickness of the connecting piece, thus the application range is wider, and thirdly, the convex plate 70 and the concave plate 80 are arranged to effectively prevent empty pressing and wrong pressing under a condition of lacking material.

Figure 7:
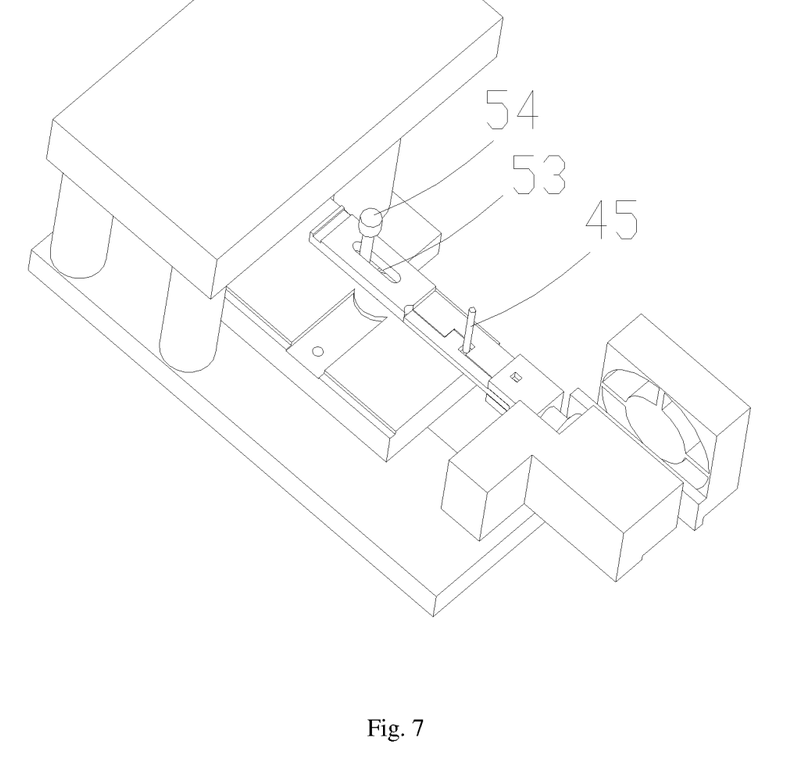
FIG. 7 is a working schematic diagram in the case of internal locking of the push plate of the product provided by the present invention.

In a practical application process, the convex plate 70 and the concave plate 80 are designed to solve a crucial problem, namely, fault locking, a locking pin 45 with a downward elastic force is arranged at a position aligned to the projection 72 of the convex plate 70 on the fixed pressing block 40, the width of the groove 84 on the concave plate 80 is larger than that of the projection 72, that is, in a process of normally conveying the connecting piece, a side edge close to the free end 71 of the projection 72 does not prop against the side edge close to the arc-shaped clamping part 83 of the groove 84, while the other sides of the projection 72 and the groove 84 are in mutual contact, in an operation process, the thrust is transmitted by the connecting piece to the concave plate 80 during feeding, in a backhaul, the other side of the projection 72 hooks the other side of the groove 84 to backhaul the concave plate 80, such that a certain empty position is consistently kept between the side edge close to the free end 71 of the projection 72 and the side edge close to the arc-shaped clamping part 83 of the groove 84, a width difference between the groove 84 on the concave plate 80 and the projection 72 is larger than or equal to the diameter of the locking pin 45, the locking pin 45 is consistently propped on an upper surface of the projection 72, under normal circumstances, the projection 72 moves forward without leaving a gap to pop up the locking pin 45, in the case of lacking material of the connecting piece, the free end 71 of the convex plate 70 does not touch the connecting piece and continues to move forward, such that the edge close to the free end 71 of the projection 72 touches the side edge close to the arc-shaped clamping part 83 of the groove 84, at this time, the other sides of the projection 72 and the groove 84 separate to expose a gap, the locking pin 45 automatically pops up downward to be inserted into the gap to prevent the pushing device 51 from continuing to push the convex plate 70 forward, and the locking work is completed to effectively empty pressing of the pressing needle (please refer to FIG. 7, together with FIGS. 1-6).

Meanwhile, since a micro switch (not shown) is arranged above the locking pin 45, and the micro switch is connected with a central processing unit, in the case of locking, the micro switch will transmit a locking signal to the central processing unit, the central processing unit can send a halt command or send an alarm signal to an operator, the pushing device 51 and the pressing device are connected with the central processing unit and are controlled by the central processing unit, the heating pipe is connected with the central processing unit, a trigger switch (not shown) is arranged at a corresponding position on the end part of the end provided with the chute 53 of the concave plate 80, the concave plate 80 triggers the trigger switch after moving in place, the trigger switch is connected with the central processing unit, the central processing unit instructs the pressing device to work according to the signal transmitted by the trigger switch, and the overall steps are unified by the central processing unit to provide multiple guarantees for the equipment for software to hardware structure, so as to prevent wrong pressing and ensure the yield.

Since the pushing device 51 generally adopts a reciprocating cylinder, this kind of equipment requires thermal insulation treatment, but the push plate 52 directly touches the heated fixed pressing block 40 and the heated connecting piece in general, so the temperature is very high, and then a contact area between the cylinder and the push plate 52 needs to be reduced as much as possible to reduce the thermal conduction, since the convex plate 70 is connected with a push rod of the pushing device 51, and a thermal insulation gap 56 is arranged between the concave plate 80 and the push rod of the pushing device 51, no direct contact thereof is required, a certain gap 56 is reserved to prevent damage of the thermal conduction to the cylinder, further, a cooling fan 57 is arranged on a side face of the pushing device 51, the fan 57 is connected with the base 20 through a bracket, and the fan 57 cools the connecting positions of the convex plate 70 and the push rod of the pushing device 51 to further guarantee the working environment of the cylinder.

A discharging passage 31 is arranged at a position aligned to the feeding hole 41 on the sliding platform 30, the discharging passage 31 is blocked by a solid bolt, when the connecting piece is clamped or when a different connecting piece needs to be changed, the remaining connecting pieces are released from the discharging passage 31, then the discharging passage is blocked by the solid bolt, and in this way, the trouble of disassembling for discharging is avoided.

The base 20 is made of a heat insulation material, and most equipment is arranged on the base 20, so the heat transfer speed is decelerated, and a lot of unnecessary connections are saved, and a connecting column 22 is arranged at one end of the base 20 for connecting a connecting platform 21 and the base 20 into an entirety.

Figure 8:
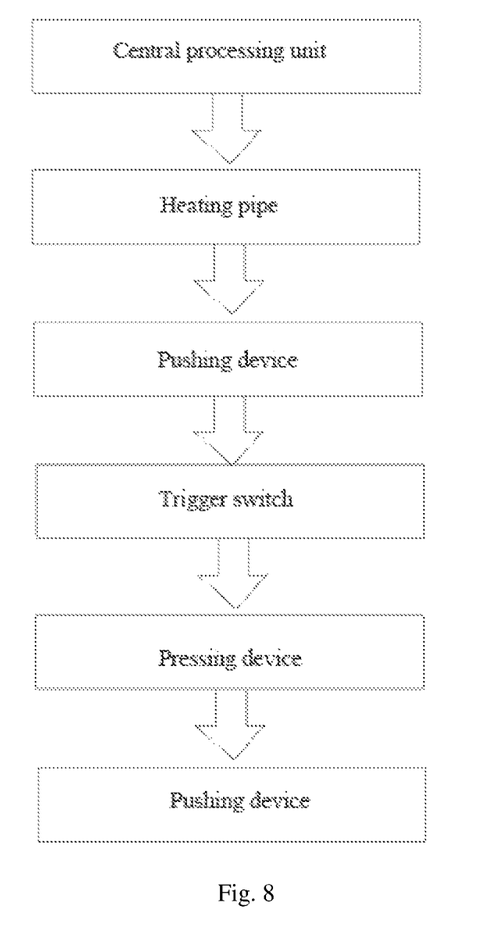
FIG. 8 is a schematic diagram of a normal working procedure of the product provided by the present invention.
Figure 9:
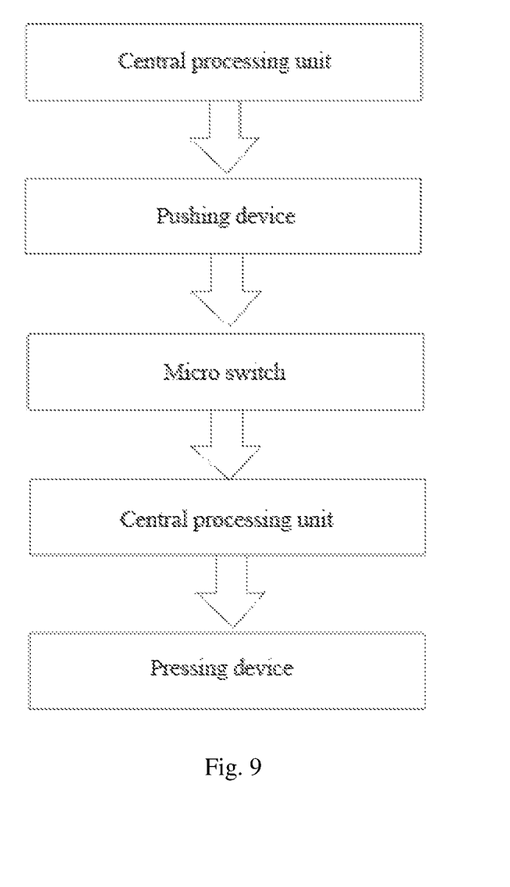
FIG. 9 is a schematic diagram of a working procedure of a locking state of the product provided by the present invention.

The present invention further provides a connecting piece implanting method, including the connecting piece implanting device in the above technical solution, the connecting piece implanting device is installed on a machine movement axis, the lower end of the pressing passage 62 is aligned to the working surface, a connecting piece needing to be implanted is input to the feeding hole 41, and a power supply is connected;

the central processing unit instructs to preheat the fixed pressing block 40 by the heating pipe, and the fixed pressing block 40 preheats the connecting piece by thermal conduction;

the connecting piece drops into the feeding hole 41 and drops onto the station 55;

the central processing unit starts the pushing device 51 to push the convex plate 70 of the push plate 52 to move, the free end 71 of the convex plate 70 props against the connecting piece, clamps the connecting piece with the arc-shaped clamping part 83 and pushes the connecting piece to move, the concave plate 80 slides along the locating pin 54 via a thrust brought by the connecting piece, and when the inner end of the chute 53 touches the locating pin 54, the connecting piece has arrived at the opening of the pressing passage 62;

at the same time, the trigger switch corresponding to the concave plate 80 is triggered by the end part of the concave plate 80, and a signal is transmitted to the central processing unit;

the central processing unit sends an instruction to the pressing device, and the pressing device drives the pressing needle 61 to press the connecting piece into the pressing passage 62 through the pressing hole 42 until arriving at the working surface directly;

thereafter, the central processing unit sends an instruction to the pressing device to pull back the pressing needle 61 into the pressing hole 42 above the pressing passage 62, then the central processing unit sends an instruction to the pressing device 51 to withdraw the push plate 52, when the station 55 arrives at the lower side of the feeding hole 41, the connecting piece drops into the station 55 under self gravity, and so far, an operating procedure is completed, please refer to FIG. 8; and further, the operating procedure is repeated, the connecting piece implanting device is installed on the working surface of a corresponding position on the machine movement axis to implant the connecting piece, when no subsequent connecting piece is supplied after the connecting piece in the feeding hole 41 is implanted, the central processing unit instructs the pushing device 51 to continue to work, no connecting piece drops onto the station 55, at this time, the free end 71 of the convex plate 70 arrives at the neighborhood of the arc-shaped clamping part 83 forward, while at this time, the projection 72 of the convex plate 70 moves forward in the groove 84 of the concave plate 80 to prop the side edge of the groove 84 to transfer the gap between the projection 72 and the groove 84 to the rear side, due to the displacement of the projection 72, the locking pin 45 pops up downward to be clamped into the gap formed by the projection 72 and the groove 84, the push plate 52 is locked and cannot move, the micro switch connected with the locking pin 45 transmits the signal to the central processing unit, the central processing unit instructs to halt, and then a step of halting under a special condition of lacking material is completed, please refer to FIG. 9.

The foregoing descriptions are merely preferred embodiments of the present invention and are not used for limiting the present invention. Any modifications, equivalent substitutions and improvement and the like made within the spirit and principle of the present invention shall fall into the protection scope of the present invention.

What is claimed is:

1. A connecting piece implanting device, comprising a base, a feeding unit, a pressing unit, a sliding platform and a fixed pressing block, wherein the sliding platform is arranged on the base, the fixed pressing block is arranged above the sliding platform, wherein, the feeding unit comprises a pushing device and a push plate connected with the pushing device in a horizontal direction, and a station capable of holding a connecting piece is arranged on the push plate;

the pressing unit comprises a pressing device, a pressing needle connected with the pressing device in a vertical direction and a pressing passage penetrating through the sliding platform and the base, and the pressing needle is driven by the pressing device to move up and down in the pressing passage;

the push plate is arranged between the sliding platform and the fixed pressing block, an up and down through chute is arranged on the push plate, the fixed pressing block and the sliding platform are both provided with corresponding pin holes, and a locating pin penetrates through the pin holes of the fixed pressing block and the sliding platform and the chute on the push plate;

a feeding hole and a pressing hole are further arranged on the fixed pressing block, the feeding hole and the pressing hole are arranged to be vertical to the push plate, the pressing hole is aligned to the pressing passage, the pressing needle presses the connecting piece into the pressing passage until arriving at a working surface after passing through the pressing hole, the feeding hole is located on a same straight line with the pressing passage and the chute, the distance between the feeding hole and the pressing passage is equal to a length of the chute, the station corresponds to the feeding hole before the push plate moves and corresponds to the pressing passage after the push plate moves in place, the fixed pressing block is provided with a through hole capable of penetrating through a heating pipe, and the heating pipe is arranged in the through hole; and the push plate is divided into a convex plate and a concave plate, an end of the convex plate is connected with a power output end of the pushing device, an opposing end of the convex plate is used as a free end for pushing the connecting piece, an outer edge of the convex plate is a straight edge, a middle part of an inner edge of the convex plate is provided with a projection extending inwards in the horizontal direction, an outer edge of the concave plate is a straight edge, the concave plate is divided into a first part and a second part, the chute is arranged on the first part, an arc-shaped clamping part is arranged at a plane step formed at a part of the concave plate, the arc-shaped clamping part corresponds to the free end of the convex plate, the free end of the convex plate and the arc-shaped clamping part form the station, an inner edge of the second part of the concave plate is provided with a groove capable of holding the projection, a depth of the groove is larger than or equal to a length of the projection, the inner edges of the convex plate and the concave plate are mutually jointed, and a pressing block groove capable of holding the push plate is arranged on a lower surface of the fixed pressing block.

2. The connecting piece implanting device of claim 1, wherein a locking pin with a downward elastic force is arranged at a position aligned to the projection of the convex plate on the fixed pressing block, a width of the groove of the concave plate is larger than that of the projection, and a width difference between the groove and the projection is larger than or equal to a diameter of the locking pin.

3. The connecting piece implanting device of claim 2, wherein a micro switch is arranged above the locking pin, the micro switch is connected with a central processing unit, the pushing device and the pressing device are connected with the central processing unit and are controlled by the central processing unit, and the heating pipe is connected with the central processing unit.

4. The connecting piece implanting device of claim 3, wherein a trigger switch is arranged at a corresponding position on an end part of the concave plate, the concave plate triggers the trigger switch, and the trigger switch is connected with the central processing unit.

5. The connecting piece implanting device of claim 4, wherein the convex plate is connected with a push rod of the pushing device, and a thermal insulation gap is arranged between the concave plate and the push rod of the pushing device.

6. The connecting piece implanting device of claim 5, wherein a cooling fan is arranged on a side face of the pushing device, and the fan is connected with the base through a bracket.

7. The connecting piece implanting device of claim 6, wherein a discharging passage is arranged at a position aligned to the feeding hole on the sliding platform, and the discharging passage is blocked by a solid bolt.

8. The connecting piece implanting device of claim 1, wherein the base is made of a heat insulation material, and a connecting column is arranged at one end of the base for connecting a connecting platform and the base.

* * * * *